Oct. 9, 1928.
C. W. BURROWS
1,686,679
APPARATUS FOR TESTING MAGNETIZABLE OBJECTS
Filed Oct. 25, 1923
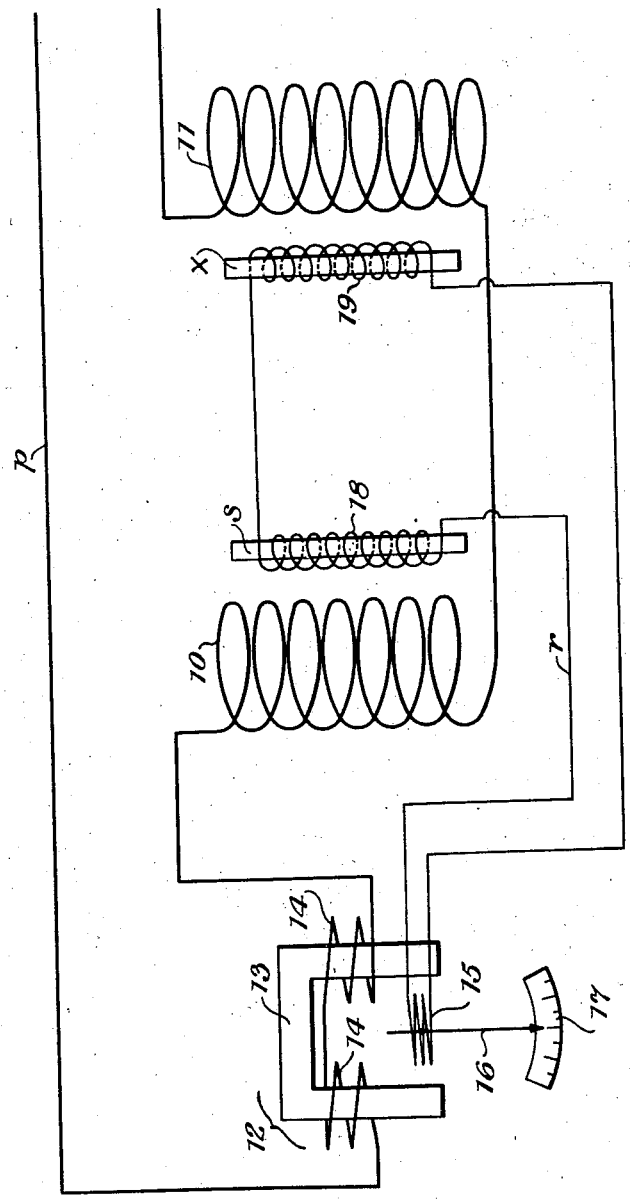
INVENTOR
Charles W. Burrows
BY
ATTORNEY Patented Oct. 9, 1928.

1,686,679

UNITED STATES PATENT OFFICE.

CHARLES W. BURROWS, OF NEW YORK, N. Y., ASSIGNOR, BY MESNE ASSIGNMENTS, TO MAGNETIC ANALYSIS CORPORATION, OF LONG ISLAND CITY, NEW YORK, A CORPORATION OF NEW YORK.

APPARATUS FOR TESTING MAGNETIZABLE OBJECTS.

Application filed October 25, 1923. Serial No. 670,700.

This invention relates to improvements in apparatus for testing magnetizable objects. It is an object of the invention to provide an extremely simple apparatus of this type for rapidly and accurately testing by magnetic analysis the physical properties of a magnetizable object.

The invention consists in certain novel features of construction and combinations and arrangements of parts as will be more fully hereinafter described and pointed out in the claim.

The accompanying drawing is a diagrammatic view of my improved apparatus.

Generally speaking, the apparatus comprises means for producing magnetic fields about a standard specimen and a specimen to be tested, a pair of bucked test coils in the respective fields, and means for indicating the differential energy absorbed by the specimen and the standard.

In the drawing a primary circuit $p$ is energized from any standard source of alternating or other reversing current (not shown). Primary coils 10, 11 are arranged in series in the primary circuit. These coils are adapted to produce magnetic fields about a standard specimen $s$ and a specimen to be tested respectively. The specimen of unknown quality has been designated by the reference latter $x$.

A dynamometer indicated generally at 12 includes the usual core 13, stationary coils 14, and a moving coil 15. The stationary coils 14 form part of the primary circuit $p$. The moving coil 15 carries the usual pointer 16 registering with a scale or dial 17. A pair of test coils 18, 19 are arranged in the magnetic fields produced by the inducing coils 10, 11. Any difference in the characteristics of the currents induced in these two test coils will be a result of the differences in the magnetic properties of the specimen $s$ and $x$. The test coils are bucked and form with the moving coil 15 a closed secondary circuit $r$. Unless there is a current flowing in the secondary circuit, there will be no movement of the pointer. When the magnetic characteristics of the specimens $s$ and $x$ are identical, the E. M. F. in one bucked coil will negative the E. M. F. in the other bucked coil, and the pointer will register at zero showing that specimen $x$ conforms to standard.

If, however, the magnetic characteristics of the specimen $x$ are dissimilar to the magnetic characteristics of the specimen $s$, there will be a difference in the electro motive force generated in the bucked coils and a resultant flow of current in the secondary circuit to which the dynamometer will be immediately sensitive. The direction of turning of the pointer 16 will depend upon which bucked coil predominates, the pointer turning in one direction to indicate that a specimen absorbs less energy than the standard, and in the opposite direction to show that it absorbs more energy than the standard, as will be readily understood.

The object selected as standard is purely arbitrary. The method is used principally for testing taps, drills, hack-saws and similar small objects, but it will be evident that if an elongated strip of stock were drawn through the test coil 19, the nature of each part of the strip as compared to the standard might be readily determined, as well as the relative properties of different parts of the same strip. I believe that the use of alternating current has heretofore been suggested in connection with apparatus for testing the physical properties of ferrous metals by magnetic analysis. I am aware of the fact that bucked coils have been previously used in connection with a standard and an unknown specimen. My apparatus is the first in which the bucked coils have been used in connection with a source of alternating current and in which the measurement or indication represents the differential energy absorbed by the specimen and the standard rather than the voltage or amperage induced in the test coils. This distinction is of importance because a standard and a specimen which may vary one from the other in certain magnetic characteristics may show no difference on a voltmeter or ammeter in the secondary circuit, but would indicate an appreciable difference in a dynamometer connected across the primary and secondary circuits.

Various changes and alterations both in method and apparatus might be resorted to without departing from the invention, and hence, I do not wish to limit myself to the precise details set forth, but shall consider myself at liberty to make such changes and alterations as fairly fall within the spirit and scope of the appended claim.

I claim:

An apparatus for testing the physical properties of magnetizable objects comprising a pair of primary coils connected in series, a pair of bucked secondary coils, and a dynamometer having the field coil thereof connected in series with said primary coils and the potential coil in series with the secondary coils.

CHARLES W. BURROWS.